United States Patent
Yang et al.

(10) Patent No.: US 10,402,354 B2
(45) Date of Patent: Sep. 3, 2019

(54) METHOD, APPARATUS, COMMUNICATION EQUIPMENT AND STORAGE MEDIA FOR DETERMINING LINK DELAY

(71) Applicant: Sanechips Technology Co., Ltd., Shenzhen, Guangdong (CN)

(72) Inventors: Lining Yang, Shenzhen (CN); Peng Hao, Shenzhen (CN); Can Huang, Shenzhen (CN)

(73) Assignee: Sanechips Technology Co., Ltd., Shenzhen, Guangdong Province (CN)

( * ) Notice: Subject to any disclaimer, the term of this patent is extended or adjusted under 35 U.S.C. 154(b) by 256 days.

(21) Appl. No.: 15/519,275

(22) PCT Filed: Apr. 14, 2015

(86) PCT No.: PCT/CN2015/076547
§ 371 (c)(1),
(2) Date: Apr. 14, 2017

(87) PCT Pub. No.: WO2016/058344
PCT Pub. Date: Apr. 21, 2016

(65) Prior Publication Data
US 2017/0235689 A1 Aug. 17, 2017

(30) Foreign Application Priority Data
Oct. 14, 2014 (CN) .......................... 2014 1 0542155

(51) Int. Cl.
*G06F 13/16* (2006.01)
*G06F 13/42* (2006.01)
(Continued)

(52) U.S. Cl.
CPC ...... *G06F 13/1689* (2013.01); *G06F 11/3027* (2013.01); *G06F 11/3419* (2013.01);
(Continued)

(58) Field of Classification Search
CPC .. G06F 13/1673; G06F 13/1689; G06F 13/42; G06F 13/4278; G06F 11/3027; G06F 11/3419
See application file for complete search history.

(56) References Cited

U.S. PATENT DOCUMENTS

2004/0001349 A1 1/2004 Perego
2007/0057835 A1 3/2007 Jarman
(Continued)

FOREIGN PATENT DOCUMENTS

CN 101366181 A 2/2009
CN 104050135 A 9/2014
(Continued)

OTHER PUBLICATIONS

JESD204B Survival Guide. Copyright 2013, Analog Devices [retrieved on Feb. 16, 2019]. Retrieved from the Internet <URL: https://www.analog.com/media/en/technical-documentation/technical-articles/JESD204B-Survival-Guide.pdf>.*
(Continued)

*Primary Examiner* — Eric T Oberly
(74) *Attorney, Agent, or Firm* — Ling Wu; Stephen Yang; Ling and Yang Intellectual Property (57) ABSTRACT

The disclosure provides a method for determining link delay. The method includes: according to a preset frequency division multiple, performing frequency division on a first Local Multi Frame Clock (LMFC) of each data lane obtained by parsing to obtain a second LMFC corresponding to each data lane, and, according to the second LMFC, writing respectively the data of each data lane into a corresponding buffer; and according to a SYSREF signal and a preset LMFC interval, generating a third LMFC, and, according to the third LMFC, reading respectively the data of each data lane from the corresponding buffer. The period of the second LMFC is the same as the period of the third LMFC. The (Continued)

disclosure also provides an apparatus, a communication device and a storage medium for implementing the method.

17 Claims, 3 Drawing Sheets

(51) Int. Cl.
*G06F 11/30* (2006.01)
*G06F 11/34* (2006.01)

(52) U.S. Cl.
CPC .......... *G06F 13/1673* (2013.01); *G06F 13/42* (2013.01); *G06F 13/4278* (2013.01)

(56) References Cited

U.S. PATENT DOCUMENTS

| | | | |
|---|---|---|---|
| 2009/0284401 A1 | 11/2009 | Nanevicz | |
| 2010/0103011 A1 | 4/2010 | Nanevicz | |
| 2013/0249719 A1* | 9/2013 | Ryan | G06F 5/06 341/118 |
| 2014/0023048 A1 | 1/2014 | Vu | |
| 2014/0105101 A1* | 4/2014 | Vu | H04L 1/0008 370/328 |
| 2014/0281654 A1* | 9/2014 | Holford | G06F 1/04 713/400 |
| 2015/0222274 A1* | 8/2015 | Cenger | H03L 7/08 327/156 |
| 2016/0041579 A1* | 2/2016 | Ali | G06F 1/08 713/400 |
| 2018/0191355 A1* | 7/2018 | Dusad | H03L 7/08 |

FOREIGN PATENT DOCUMENTS

| | | |
|---|---|---|
| EP | 1926256 A1 | 5/2008 |
| EP | 2778942 A1 | 9/2014 |

OTHER PUBLICATIONS

Texas Instrument, JESD204B Overview [retrieved on Feb. 16, 2019]. Retrieved from the Internet <URL: http://www.ti.com/lit/ml/slap161/slap161.pdf>.*
"Using JESD204B for Wideband Data Converter Apps", Jan. 2012, George Diniz, Retrieved from the Internet: URL:http://archive.eetasia.com/www.eetasia.com/STATIC/PDF/201211/ EEOL_2012NOV29_AMP_ INT_TA_01.pdf?SOURCES=DOWNLOAD, EE Times/Asia, pp. 1-4.
"Slay Your System Dragons with JESD204B", Jan. 2013, Ian Beavers, JESD204B Survival Guide, Retrieved from the Internet: URL:https://www.mouser.com/pdfdocs/MS2503SlayYourSystemDragonswithJESD204B.PDF, pp. 44-47.
Supplementary European Search Report in European application No. 15850035.5, dated Oct. 5, 2017, 7 pgs.
International Search Report in international application No. PCT/CN2015/076547, dated Jun. 29, 2015, 2 pgs.
English Translation of the Written Opinion of the International Search Authority in international application No. PCT/CN2015/076547, dated Jun. 29, 2015, 5 pgs.
CNKI; Jun. 30, 2013; Anthony Desimone, Michael Giancioppo; "Grasp the key problem of JESD204B interface function" 9 Pgs.
2013 IEEE 15th Electronics Packaging Technology Conference (EPTC 2013); Dec. 13, 2013; H.Y.Zhang, X.W. Zhang,etc.; "Thermal characterization and simulation study of 2.5D packages with multi-chip module on through silicon interposer" p. 363-368.

* cited by examiner

METHOD, APPARATUS, COMMUNICATION EQUIPMENT AND STORAGE MEDIA FOR DETERMINING LINK DELAY

TECHNICAL FIELD

The disclosure relates to JESD204B interface technologies in the field of wireless communications, and in particular to a method, an apparatus, a communication device and a storage medium for determining link delay based on JESD204B interface.

BACKGROUND

At present, the requirement of the increasing base station data throughput causes increases in both component cost and power consumption of wireless communication units and makes related printed circuit boards and interfaces more complex, and meanwhile puts more emphasis on the requirement of signal integrity.

Thus, traditional concurrent Low-Voltage Differential Signalling (LVDS) I/O interfaces are no longer suitable for the demands on cost reduction, system reliability enhancement, integration improvement, shortening of the time to market, design complexity reduction and so on; therefore, Solid State Technology Association (JEDEC) publishes a JESD204B interface standard applicable to the universal interface of Analogue Digital Conversion (ADC)/Digital Analogue Conversion (DAC).

As the proposal of the JESD204B interface standard, how to realize the alignment of a plurality of data lanes at the receiving side and how to guarantee the determined delay of link become problems needed to be resolved urgently for the adoption of the JESD204B interface standard. However, the JESD204B interface protocol puts forward a limit that the processing delay from a data transmitting end to a data receiving data cannot exceed the length of one Local Multi Frame Clock (LMFC) (or called a local multi frame head) at most and that the delay difference between each lane cannot exceed the length of one LMFC too. However, the length of the LMFC may have a minimum of 17 bytes. Since the delay is shorter if the board level wiring is shorter, the limit of the above protocol has a high demand on hardware processing and board level wiring, so that the complexity of the design implementation is greatly increased.

SUMMARY

In order to solve the technical problem in existing technologies, embodiments of the disclosure provide a method, an apparatus, a communication device and a storage medium for determining link delay.

An embodiment of the disclosure provides a method for determining link delay, including:

according to a preset frequency division multiple, performing frequency division on a first LMFC of each data lane obtained by parsing to obtain a second LMFC corresponding to each data lane, and according to the second LMFC, writing respectively data of each data lane into a corresponding buffer; and according to a system reference (SYSREF) signal and a preset LMFC interval, generating a third LMFC, and, according to the third LMFC, reading respectively the data of each data lane from the corresponding buffer.

The period of the second LMFC is the same as the period of the third LMFC.

Here, the period of the second LMFC corresponding to each data lane obtained after the frequency division is greater than a data transmission delay difference corresponding to the data lane having the maximum data transmission delay in all the data lanes before the frequency division.

Here, according to a preset frequency division multiple, performing frequency division on a first LMFC of each data lane obtained by parsing includes:

parsing the received data of each data lane, and according to the Initial Lane Alignment (ILA) information already existing in the data of each data lane, parsing to obtain the first LMFC; and, according to the preset frequency division multiple, performing frequency division on the first LMFC obtained by parsing to obtain a second LMFC.

Here, according to the second LMFC, writing the data of each data lane into a buffer includes:

for each data lane, resetting the data write address of the buffer according to the first valid signal of the second LMFC, and then writing the data of each data lane into the buffer in sequence.

Here, in each data lane, the data transmission delay difference is: $(N-1)*T\_LMFC$;

where N is the preset frequency division multiple, and $T\_LMFC$ is the length of a standard LMFC.

Here, according to the third LMFC, reading the data of each data lane from the buffer includes:

for each data lane, resetting the read address of the buffer according to the first valid signal of the third LMFC, and then reading the data of each data lane from the buffer in sequence.

An embodiment of the disclosure further provides a storage medium, including a set of instructions, which, when executed, causes at least one processor to execute the operation described above.

An embodiment of the disclosure further provides an apparatus for determining link delay, including: a frequency division and write control unit, a buffer and read control unit.

The frequency division and write control unit is configured to: according to a preset frequency division multiple, perform frequency division on a first LMFC of each data lane obtained by parsing to obtain a second LMFC of each data lane, and, according to the second LMFC, write respectively the data of each data lane into a corresponding buffer.

The read control unit is configured to: according to a SYSREF signal and a preset LMFC interval, generate a third LMFC, and, according to the third LMFC, read respectively the data of each data lane from the corresponding buffer.

Here the period of the second LMFC is the same as the period of the third LMFC.

Here, the frequency division and write control unit includes: a frequency division module and a write module, and the frequency division module is configured to: according to the preset frequency division multiple, perform frequency division on the first LMFC of each data lane obtained by parsing to obtain the second LMFC corresponding to each data lane; and the write module is configured to: according to the second LMFC generated by the frequency division module, write the data of each data lane into the corresponding buffer.

Here, the read control unit includes: an LMFC generation module and a read module.

The LMFC generation module is configured to: according to the SYSREF signal and the preset LMFC interval, generate the third LMFC;

the read module is configured to: according to the third LMFC generated by the LMFC generation module, read respectively the data of each data lane from the corresponding buffer.

An embodiment of the disclosure further provides a communication device for determining link delay, including the apparatus described above.

The method, apparatus, communication device and storage medium for determining link delay provided by embodiments of the disclosure perform frequency division, according to a preset frequency division multiple, on a first LMFC of each data lane obtained by parsing to obtain a second LMFC corresponding to each data lane, and write respectively the data of each data lane into a corresponding buffer according to the second LMFC, generate a third LMFC according to a SYSREF signal and a preset LMFC interval, and read respectively the data of each data lane from the corresponding buffer according to the third LMFC. The period of the second LMFC is the same as the period of the third LMFC. Thus, the embodiment of the disclosure eases the restriction to the delay processing of existing links, may reduce the complexity of clock (the processing lock for JESD204B interface for receiving data) frequency and link processing. In addition, the setting of the buffer may support different delay differences of different data lanes before data alignment. Since the delay may be greater than the length of a standard LMFC, the number of periods of the lane transmission processing clock is increased. Therefore, the design requirements for board level wiring may be reduced correspondingly, and the complexity of design may be reduced.

In addition, as the change of application scenes, embodiments of the disclosure only need to change the configuration of the lengths of the second LMFC and the third LMFC, that is, change the preset frequency division multiple and the LMFC interval according to the change of application scenes, and change the size of the buffer correspondingly. Such changes have high flexibility.

BRIEF DESCRIPTION OF THE DRAWINGS

In drawings (which are not necessarily drawn according to proportion), similar drawing references may be used to describe similar parts in different views. Similar drawing references with different letter suffixes may indicate different examples of similar parts. The drawings generally illustrate each embodiment discussed herein by way of examples rather than limit.

DETAILED DESCRIPTION

In the embodiment of the disclosure, according to a preset frequency division multiple, frequency division is performed on a first LMFC of each data lane obtained by parsing to obtain a second LMFC corresponding to each data lane, and, according to the second LMFC, data of each data lane is respectively written into a corresponding buffer; and according to a SYSREF signal and a preset LMFC interval, a third LMFC is generated, and according to the third LMFC, the data of each data lane is respectively read from the corresponding buffer. The period of the second LMFC is the same as the period of the third LMFC.

Here, the method described in the embodiment of the disclosure is implemented at the receiving side. The corresponding receiving process is a process of transmitting data from ADC to a JESD204B interface data lane.

It should be noted that: since the method of the embodiment of the disclosure is based on the JESD204B interface, the method is widely applicable to the requirements of existing ADC devices.

The disclosure is described below in further detail in conjunction with the drawings and specific embodiments.

Figure 1:
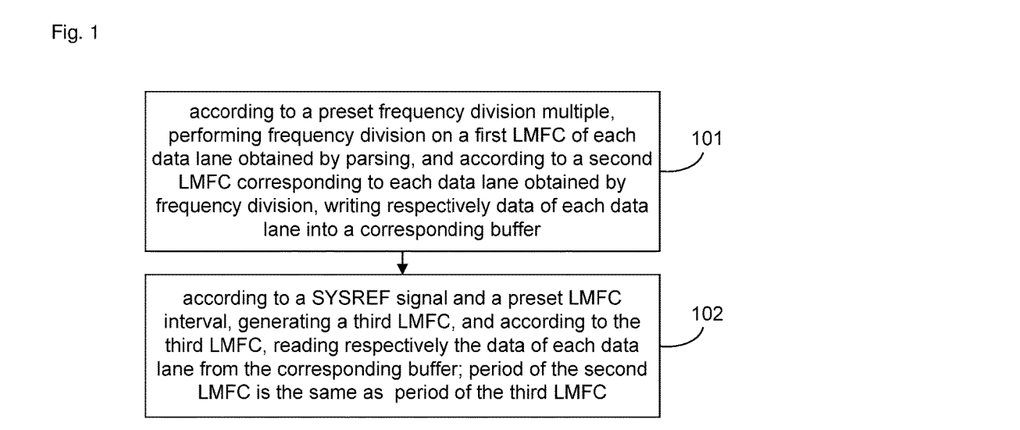
FIG. 1 is an implementation flowchart of a method for determining link delay according to an embodiment of the disclosure.

FIG. 1 is an implementation flowchart of a method for determining link delay according to an embodiment of the disclosure. As shown in FIG. 1, the method includes:

Step 101: according to a preset frequency division multiple, performing frequency division on a first LMFC of each data lane obtained by parsing to obtain a second LMFC corresponding to each data lane, and according to the second LMFC, writing respectively the data of each data lane into a corresponding buffer.

Specifically, the received data of each data lane is parsed. According to the Initial Lane Alignment (ILA) information already existing in the data of each data lane, parsing is performed to obtain the first LMFC, that is, a lane associated LMFC. The reason why the first LMFC is called the lane associated LMFC is that the LMFC is obtained by parsing the transmitted data of the lane but is not locally recovered, and moreover, the first LMFC of each data lane obtained by parsing is not the same, that is, the first LMFC of each data lane is not aligned. According to the preset frequency division multiple, frequency division is performed on the first LMFC of each data lane obtained by parsing to obtain the second LMFC corresponding to each data lane, that is, a new and extended lane associated LMFC. According to the second LMFC, the data of each data lane is respectively written into a respective buffer corresponding to each data lane. Specifically, for each data lane, the data write address of the buffer is reset according to the first valid signal of the second LMFC, and then the data of each data lane is written into the buffer in sequence.

Of course, here the data write address also may be reset according to the second valid signal of the second LMFC. However, it must guarantee that, under one frequency division configuration, only one reset is allowed, and continuous resets are not allowed.

In addition, since different data lanes have different delays in transmitting data, the moment when the data is written into the buffer probably is not the same.

Here, following points need to be considered when configuring the frequency division multiple:

(1) For the condition of a single data lane, it is needed to consider the delay difference of the data of the single data lane on the entire transmission link from the opposite end JESD204B interface framing to the local JESD204B interface deframing, that is, the delay difference of the data transmission of the single data lane; then, the LMFC period after the frequency division needs to be greater than the transmission delay difference before the frequency division.

(2) For the condition of multiple data lanes, it is needed to consider the delay difference of the data of the multiple data lanes on the entire transmission link from the opposite end JESD204B interface framing to the local JESD204B interface deframing, that is, the delay difference of the data transmission of each data lane; then, the LMFC period after the frequency division needs to be greater than the transmission delay difference of the lane having the maximum transmission delay before the frequency division.

Therefore, for the data transmission of the multiple data lanes in the embodiment of the disclosure, the period of the second LMFC obtained after the frequency division is greater than a data transmission delay difference corresponding to the data lane having the maximum data transmission delay in all the data lanes before the frequency division.

In addition, the preset frequency division multiples for different data lanes in the embodiment of the disclosure must be kept consistent; therefore, only one frequency division multiple needs to be configured.

In the embodiment of the disclosure, in order to ensure that there is no other data in the buffer before storing the data of each data lane, during actual operations it is needed to first clear the write address in the buffer using the second LMFC. The specific operation is described as the above mentioned.

Step 102: according to a SYSREF signal and a preset LMFC interval, generating a third LMFC, and according to the third LMFC, reading respectively data of each data lane from the corresponding buffer. The period of the second LMFC is the same as the period of the third LMFC.

Figure 2:
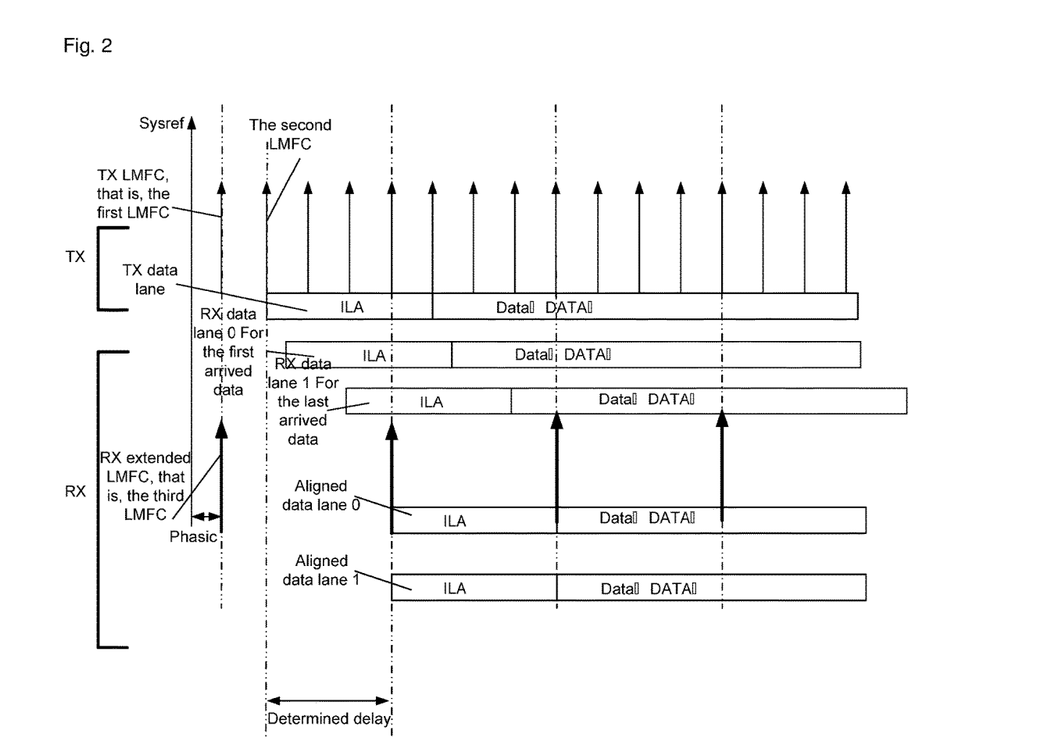
FIG. 2 is schematic diagram of determining link delay according to an embodiment of the disclosure.

Here, the SYSREF signal is an existing signal in the JESD204B interface protocol. The transmitting side determines the start point of data transmission according to the SYSREF signal, and generates, according to the SYSREF signal, a protocol standard LMFC, that is, the first LMFC mentioned above. As shown in FIG. 2, in the JESD204B interface protocol, the transmitting side starts transmitting data from the second LMFC.

In Step 102, a new uniform LMFC is generated according to the SYSREF signal and the preset LMFC interval, that is, the third LMFC is generated. The interval between adjacent two third LMFCs is the same as the interval between adjacent two second LMFCs, that is, the period of the third LMFC is the same as the period of the second LMFC; the data of each data lane is read from the buffer at the boundary of the third LMFC. Specifically, for each data lane, the read address of the buffer is reset according to the first valid signal of the generated new uniform third LMFC, and then the data of each data lane is read from the buffer in sequence. Of course, here the data read address also may be reset according to the second valid signal of the third LMFC, but it must guarantee that, under one frequency division configuration, only one reset is allowed, continuous resets are not allowed.

Here, in order to ensure that no other data is read when reading the data of each data lane. During actual operations it is needed to first clear the read address of the buffer using the third LMFC.

In the embodiment of the disclosure, the frequency division basis of the third LMFC is the same as the frequency division basis of the second LMFC, as described above. The second LMFC controls the data of data lanes to be written into the buffer. Since each data lane has a different delay difference, the first LMFC of each data lane is not aligned, and the second LMFC obtained by frequency division is not aligned. Therefore, the write of the data of each data lane can only be controlled by the second LMFC of the corresponding lane. However, in order to guarantee the alignment among multiple data lanes when reading data, a uniform LMFC, that is, the third LMFC, is needed to perform the control. The third LMFC can only be generated according to the SYSREF signal, and cannot be obtained by frequency division according to the first LMFC of a certain data lane.

To sum up, the embodiment of the disclosure may ensure that the data of each data lane is read starting from one same moment after being buffered. In this way, the data output of each data lane is aligned, and moreover the data delay (from the transmitting side to the receiving side) of each data lane is the same.

In the embodiment of the disclosure, a corresponding buffer is set corresponding to each data lane so as to realize the buffer of the data of each data lane. Although the data of each data lane is transmitted uniformly at the transmitting side, due to the board delay, the moment of arriving at the receiving side probably is different. Thus the buffer is needed to delay the data of each data lane, so as to guarantee that the data of each data lane is output at the same moment and that the data of each data lane is aligned.

Thus, the embodiment of the disclosure eases the restriction to the delay processing of existing links, and it may reduce the complexity of clock (the processing lock for JESD204B interface for receiving data) frequency and link processing. In addition, the setting of the buffer may support different delay differences of different data lanes before data alignment. Since the delay may be greater than the length of a standard LMFC, the number of periods of the lane transmission processing clock is increased. Therefore, the design requirements for board level wiring may be reduced correspondingly, and the complexity of design may be reduced.

The selection of the above processing lock for JESD204B interface for receiving data is associated to the processing delay of the whole data lane. The higher the processing clock is, the higher is the number of the clock periods of the transmission delay of the whole data lane. The lower the processing clock is, the lower is the number of the clock periods of the transmission delay of the whole data lane. By using the LMFC frequency division method of the embodiment of the disclosure, the processing clock may be selected lower, so as to correspondingly increase the number of the clock periods of the transmission delay.

In addition, as the change of application scenes, the embodiment of the disclosure only needs to change the configuration of the lengths of the second LMFC and the third LMFC, that is, change the preset frequency division multiple and the LMFC interval according to the change of application scenes, and change the size of the buffer correspondingly. Such changes have high flexibility.

The embodiment of the disclosure further provides a storage medium, including a set of instructions, which, when executed, causes at least one processor to execute the operation described above.

FIG. 2 is schematic diagram of determining link delay according to an embodiment of the disclosure. As shown in FIG. 2, the transmitting side (TX) generates a standard LMFC, that is, the first LMFC, according to a SYSREF signal, and the receiving side (RX) also generates an extended LMFC, that is, the third LMFC, according to the SYSREF signal. The extended LMFC and the standard LMFC are aligned. The starting point of each data lane transmitting data is at the location of the LMFC (the second LMFC valid signal). Due to the board wiring delay, the data of different data lanes arrives at the receiving side at different time. The receiving side uses the buffer, and uniformly reads the data of each data lane from the buffer at the boundary of the extended LMFC. Thus, through the extension of the standard LMFC, the delay of the data of the data lane may exceed the length of a standard LMFC.

As shown in FIG. 2, the delay difference between each data lane also may exceed the length of a standard LMFC. The link determined delay difference of all data lanes is (N−1)*T_LMFC, where N is an extended multiple of the standard LMFC, that is, the preset frequency division multiple mentioned above, and T_LMFC is the length of a standard LMFC.

Figure 3:
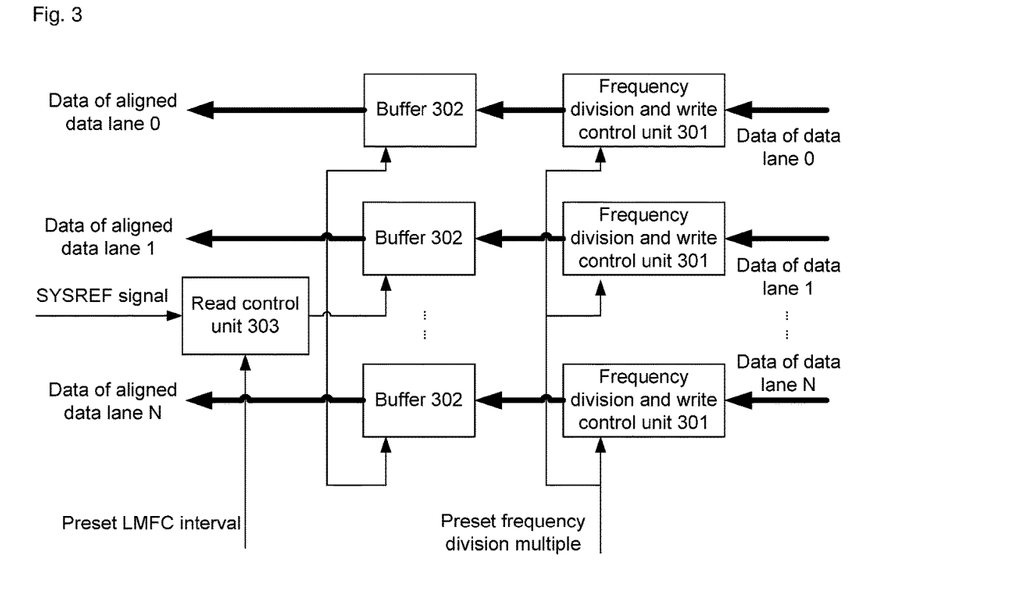
FIG. 3 is a structure diagram of an apparatus for determining link delay according to an embodiment of the disclosure.

The embodiment of the disclosure further provides an apparatus for determining link delay. As shown in FIG. 3, the apparatus includes: a frequency division and write control unit 301, a buffer 302 and a read control unit 303. In the embodiment of the disclosure, the buffer 302 and the read control unit 303 may be correspondingly set for each data lane respectively, in which, the frequency division and write control unit 301 is configured to: according to a preset frequency division multiple, perform frequency division on a first LMFC of each data lane obtained by parsing to obtain a second LMFC corresponding to each data lane, and according to the second LMFC, write respectively the data of each data lane into the corresponding buffer 302.

Specifically, the frequency division and write control unit 301 parses the received data of each data lane, parses according to the ILA information already existing in the data of each data lane to obtain the first LMFC, that is, a lane associated LMFC, performs frequency division, according to the preset frequency division multiple, on the first LMFC obtained by parsing to obtain a second LMFC, that is, a new extended lane associated LMFC, and, writes the data of each data lane into the buffer according to the second LMFC. Specifically, the frequency division and write control unit 301 may reset the data write address according to the first valid signal of the second LMFC and then write the data of the data lane into the buffer in sequence.

Of course, here the data write address also may be reset according to the second valid signal of the second LMFC, but it must guarantee that, under one frequency division configuration, only one reset is allowed, continuous resets are not allowed.

In the above content, the period of the second LMFC corresponding to each data lane obtained after the frequency division is greater than a data transmission delay difference corresponding to the data lane having the maximum data transmission delay in all the data lanes before the frequency division.

Here, following points need to be considered when configuring the frequency division multiple:

(1) The delay difference of the data of a single data lane on the entire transmission link from the opposite end JESD204B interface framing to the local JESD204B interface deframing, correspondingly, the LMFC period after the frequency division needs to be greater than the transmission delay difference.

(2) The delay difference of the data of multiple data lanes on the entire transmission link from the opposite end JESD204B interface framing to the local JESD204B interface deframing, correspondingly, the LMFC period after the frequency division needs to be greater than the delay difference of the lane having the maximum transmission delay.

In addition, the preset frequency division multiples for different data lanes in the embodiment of the disclosure must be kept consistent. Therefore, only one frequency division multiple needs to be configured.

the read control unit 303 is configured to: according to a SYSREF signal and a preset LMFC interval, generate a third LMFC, and according to the third LMFC, read respectively the data of each data lane from the corresponding buffer 302.

The read process specifically may include resetting the read address according to the first valid signal of the third LMFC, and then reading the data of each data lane from the buffer in sequence. Of course, here the data read address also may be reset according to the second valid signal of the third LMFC, but it must guarantee that, under one frequency division configuration, only one reset is allowed, continuous resets are not allowed.

Here, the interval between adjacent two second LMFCs is the same as the interval between adjacent two third LMFCs, that is, the period of the third LMFC is the same as the period of the second LMFC.

During actual applications, the frequency division and write control unit 301 and the read control unit 303 may be implemented through a Central Processing Unit (CPU), a Digital Signal Processor (DSP) or a Field-Programmable Gate Array (FPGA).

Here, the SYSREF signal is an existing signal in the JESD204B interface protocol. The transmitting side determines the start point of data transmission according to the SYSREF signal, and generates, according to the SYSREF signal, a protocol standard LMFC, that is, the first LMFC mentioned above. As shown in FIG. 2, in the JESD204B interface protocol, the transmitting side starts transmitting data from the second LMFC.

In this step, a new LMFC is generated according to the SYSREF signal and the preset LMFC interval, that is, the third LMFC is generated. The interval between adjacent two third LMFCs is the same as the interval between adjacent two second LMFCs, that is, the period of the third LMFC is the same as the period of the second LMFC. The data of each data lane is read from the buffer at the boundary of the third LMFC. Here, in order to ensure that no other data is read when reading the data of each data lane, during actual operations it is needed to first clear the read address of the buffer using the third LMFC.

In the embodiment of the disclosure, the corresponding buffer 302 is set corresponding to each data lane so as to realize the buffer of the data of each data lane. Although the data of each data lane is transmitted uniformly at the transmitting side, due to the board delay, the moment of arriving at the receiving side probably is different. Thus the buffer 302 is needed to delay the data of each data lane, so as to guarantee that the data of each data lane is output at the same moment and that the data of each data lane is aligned.

Thus, the embodiment of the disclosure eases the restriction to the delay processing of existing links, and it may reduce the complexity of clock (the processing lock for JESD204B interface for receiving data) frequency and link processing. In addition, the setting of the buffer may support different delay differences of different data lanes before data alignment. Since the delay may be greater than the length of a standard LMFC, the number of periods of the lane transmission processing clock is increased. Therefore, the design requirements for board level wiring may be reduced correspondingly, and the complexity of design may be reduced.

In addition, as the change of application scenes, the embodiment of the disclosure only needs to change the configuration of the lengths of the second LMFC and the third LMFC, that is, change the preset frequency division multiple and the LMFC interval according to the change of application scenes, and change the size of the buffer correspondingly. Such changes have high flexibility.

Figure 4:
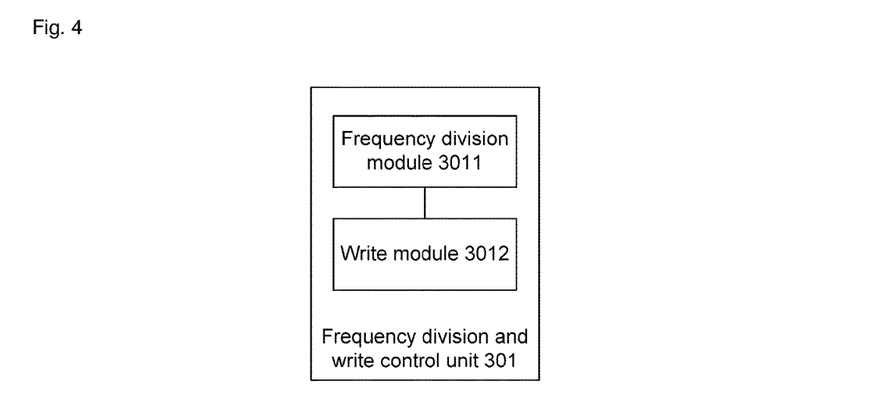
FIG. 4 is a structure diagram of a frequency division and write control unit according to an embodiment of the disclosure.

In an embodiment of the disclosure, as shown in FIG. 4, the frequency division and write control unit 301 includes: a frequency division module 3011 and a write module 3012.

Here, the frequency division module 3011 is configured to: according to the preset frequency division multiple, perform frequency division on the first LMFC of each data lane obtained by parsing to obtain the second LMFC corresponding to each data lane; and the write module 3012 is configured to: according to the second LMFC generated by the frequency division module 3011, write the data of each data lane into the corresponding buffer 302.

The frequency division module 3011 and the write module 3012 may be implemented through a CPU, DSP or FPGA.

Figure 5:
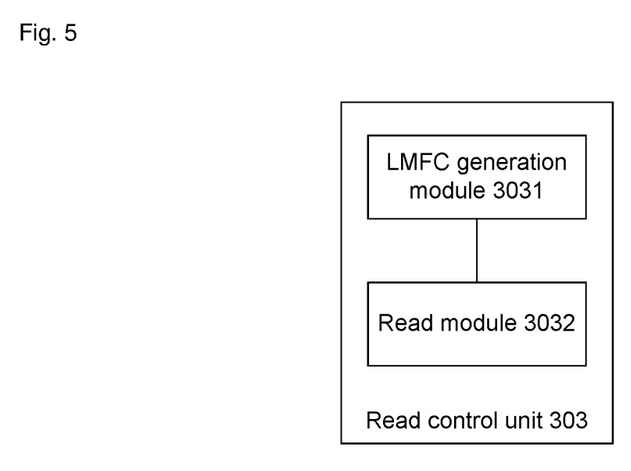
FIG. 5 is a structure diagram of a read control unit according to an embodiment of the disclosure.

In an embodiment of the disclosure, the read control unit 303 includes: an LMFC generation module 3031 and a read module 3032.

Here, the LMFC generation module 3031 is configured to: according to the SYSREF signal and the preset LMFC interval, generate the third LMFC; and the read module 3032 is configured to: according to the third LMFC generated by the LMFC generation module 3031, read respectively the data of each data lane from the corresponding buffer 302.

The LMFC generation module 3031 and read module 3032 may be implemented through a CPU, DSP or FPGA.

The embodiment of the disclosure further provides a communication device for determining link delay, including the apparatus described above. For example, the communication device may be a device in a wireless base station and the like.

Those skilled in the art should understand that the embodiments of the disclosure can provide a method, a system or a computer program product. Thus, forms of hardware embodiments, software embodiments or embodiments integrating software and hardware can be adopted in the disclosure. Moreover, a form of the computer program product implemented on one or more computer available storage media (including, but not limited to, a disk memory, an optical memory and the like) containing computer available program codes can be adopted in the disclosure.

The disclosure is described with reference to flowcharts and/or block diagrams of the method, the device (system) and the computer program product according to the embodiments of the disclosure. It should be understood that each flow and/or block in the flowcharts and/or the block diagrams and a combination of the flows and/or the blocks in the flowcharts and/or the block diagrams can be realized by computer program instructions. These computer program instructions can be provided for a general computer, a dedicated computer, an embedded processor or processors of other programmable data processing devices to generate a machine, so that an apparatus for realizing functions assigned in one or more flows of the flowcharts and/or one or more blocks of the block diagrams is generated via instructions executed by the computers or the processors of the other programmable data processing devices.

These computer program instructions can also be stored in a computer readable memory capable of guiding the computers or the other programmable data processing devices to work in a specific mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions can also be loaded to the computers or the other programmable data processing devices, so that processing realized by the computers is generated by executing a series of operation steps on the computers or the other programmable devices, and therefore the instructions executed on the computers or the other programmable devices provide a step of realizing the functions assigned in one or more flows of the flowcharts and/or one or more blocks of the block diagrams.

The above are merely the preferred embodiments of the disclosure, but not to limit the protection scope of the disclosure.

What is claimed is:

1. A method for determining link delay, comprising:
   according to a preset frequency division multiple, performing frequency division on a first Local Multi Frame Clock (LMFC) of each data lane obtained by parsing to obtain a second LMFC corresponding to each data lane, and according to the second LMFC, writing respectively data of each data lane into a corresponding buffer; and
   according to a system reference (SYSREF) signal and a preset LMFC interval, generating a third LMFC, and according to the third LMFC, reading respectively the data of each data lane from the corresponding buffer, wherein
   a period of the second LMFC is the same as a period of the third LMFC;
   wherein the period of the second LMFC corresponding to each data lane obtained after the frequency division is greater than a data transmission delay difference corresponding to a data lane having the maximum data transmission delay in all the data lanes before the frequency division.

2. The method according to claim 1, wherein, according to the preset frequency division multiple, performing the frequency division on the first LMFC of each data lane obtained by parsing comprises:
   parsing received data of each data lane, and according to an Initial Lane Alignment (ILA) information already existing in the data of each data lane, parsing to obtain the first LMFC; and according to the preset frequency division multiple, performing frequency division on the first LMFC obtained by parsing to obtain the second LMFC.

3. A non-transitory storage medium, comprising a set of instructions, which, when executed, causes at least one processor to execute the method according to claim 2.

4. The method according to claim 1, wherein, according to the second LMFC, writing the data of each data lane into the corresponding buffer comprises:
   for each data lane, resetting a data write address of the corresponding buffer according to a first valid signal of the second LMFC, and then writing the data of each data lane into the corresponding buffer in sequence.

5. A non-transitory storage medium, comprising a set of instructions, which, when executed, causes at least one processor to execute the method according to claim 4.

6. The method according to claim 1, wherein, in each data lane, the data transmission delay difference is: $(N-1)*T\_LMFC$;
   where N is the preset frequency division multiple, and T_LMFC is the length of a standard LMFC.

7. A non-transitory storage medium, comprising a set of instructions, which, when executed, causes at least one processor to execute the method according to claim 6.

8. The method according to claim 1, wherein, according to the third LMFC, reading the data of each data lane from the corresponding buffer comprises:

for each data lane, resetting a read address of the corresponding buffer according to a first valid signal of the third LMFC, and then reading the data of each data lane from the corresponding buffer in sequence.

9. A non-transitory storage medium, comprising a set of instructions, which, when executed, causes at least one processor to execute the method according to claim 8.

10. A non-transitory storage medium, comprising a set of instructions, which, when executed, causes at least one processor to execute the method according to claim 1.

11. The method according to claim 1, wherein, according to the preset frequency division multiple, performing frequency division on the first LMFC of each data lane obtained by parsing comprises:
    parsing received data of each data lane, and according to an Initial Lane Alignment (ILA) information already existing in the data of each data lane, parsing to obtain the first LMFC; and according to the preset frequency division multiple, performing frequency division on the first LMFC obtained by parsing to obtain the second LMFC.

12. An apparatus for determining link delay, comprising a processor, a buffer and a memory for storing instructions executable by the processor; wherein the processor is configured to implement: a frequency division and write control unit, a read control unit, wherein
    the frequency division and write control unit is configured to: according to a preset frequency division multiple, perform frequency division on a first Local Multi Frame Clock (LMFC) of each data lane obtained by parsing to obtain a second LMFC corresponding to each data lane, and according to the second LMFC, write respectively data of each data lane into the corresponding buffer; and
    the read control unit is configured to: according to a SYSREF signal and a preset LMFC interval, generate a third LMFC, and according to the third LMFC, read respectively the data of each data lane from the corresponding buffer, wherein a period of the second LMFC is the same as a period of the third LMFC;
    wherein the period of the second LMFC corresponding to each data lane obtained after the frequency division is greater than a data transmission delay difference corresponding to a data lane having the maximum data transmission delay in all the data lanes before the frequency division.

13. The apparatus according to claim 12, wherein the processor is further configured to implement: a frequency division module and a write module, wherein
    the frequency division module is configured to: according to the preset frequency division multiple, perform the frequency division on the first LMFC of each data lane obtained by parsing to obtain the second LMFC corresponding to each data lane; and
    the write module is configured to: according to the second LMFC generated by the frequency division module, write the data of each data lane into the corresponding buffer.

14. A communication device for determining link delay, comprising the apparatus according to claim 13.

15. The apparatus according to claim 12, wherein, the processor is further configured to implement: an LMFC generation module and a read module, wherein
    the LMFC generation module is configured to: according to the SYSREF signal and the preset LMFC interval, generate the third LMFC;
    the read module is configured to: according to the third LMFC generated by the LMFC generation module, read respectively the data of each data lane from the corresponding buffer.

16. A communication device for determining link delay, comprising the apparatus according to claim 15.

17. A communication device for determining link delay, comprising the apparatus according to claim 12.

* * * * *